US 8,893,220 B2

(12) United States Patent
Bastide et al.

(10) Patent No.: US 8,893,220 B2
(45) Date of Patent: Nov. 18, 2014

(54) MANAGING CO-EDITING SESSIONS

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 13/838,360

(22) Filed: Mar. 15, 2013

(65) Prior Publication Data

US 2014/0282826 A1    Sep. 18, 2014

(51) Int. Cl.
*G06F 21/60* (2013.01)
*G06F 17/30* (2006.01)
*G06F 17/24* (2006.01)

(52) U.S. Cl.
CPC ........ *G06F 17/30011* (2013.01); *G06F 17/246* (2013.01); *G06F 21/60* (2013.01)
USPC ...................... 726/1; 726/28; 726/30; 726/31

(58) Field of Classification Search
None
See application file for complete search history.

(56) References Cited

U.S. PATENT DOCUMENTS

| 8,291,019 | B1 * | 10/2012 | Rochelle et al. ............... 709/205 |
| 2008/0071945 | A1 * | 3/2008 | Yang et al. ....................... 710/38 |
| 2011/0078246 | A1 * | 3/2011 | Dittmer-Roche ............. 709/205 |
| 2011/0209052 | A1 * | 8/2011 | Parker et al. ................... 715/255 |
| 2013/0198145 | A1 * | 8/2013 | Avery et al. .................... 707/687 |

OTHER PUBLICATIONS

Microsoft Corporation, "Lock Cells in a Worksheet", Microsoft Corporation, <http://office.microsoft.com/en-us/excel-help/lock-cells-in-a-worksheet-HA010342979.aspx>, Retrieved Jun. 18, 2014, pp. 1-3.

* cited by examiner

*Primary Examiner* — Hadi Armouche
*Assistant Examiner* — Andrew Steinle
(74) *Attorney, Agent, or Firm* — Law Office of Jim Boice

(57) ABSTRACT

A computer-implemented method, system, and/or computer program mediates a co-editing session for a document. After establishing a co-editing session for a first user and a second user to co-edit a document, a first modification of the document is received from the first user. A second modification of the document, which eliminates the first modification, is subsequently received from the second user. In response to a quantity of subsequent modifications, after the first and second modifications, exceeding a predetermined value, an action is initiated to prevent further modifications to the document.

13 Claims, 3 Drawing Sheets

MANAGING CO-EDITING SESSIONS

BACKGROUND

The present disclosure relates to the field of computers, and specifically to the use of computers for modifying document files. Still more particularly, the present disclosure relates to collaboratively modifying document files between multiple users/systems.

A document file is defined as a collection of data, which is managed at a first tier by a software application. The phrase "managed at a first tier" is defined as software/hardware management that controls how/where the document is stored/updated, as well as how/to whom the document file is presented (e.g., on a user interface), etc.

For example, a text document is a document file that is first-tier managed by a word processing application, which stores the original version of the text document, as well as changes to the text document. A spreadsheet (or worksheet) is a document file that is first-tier managed by a spreadsheet application. A video file is a document file that is first-tier managed by video editing/storage/presentation application. An audio file is a document file that is first-tier managed by an audio storage/generation/editing application.

SUMMARY

A computer-implemented method, system, and/or computer program mediates a co-editing session for a document. After establishing a co-editing session for a first user and a second user to co-edit a document, a first modification of the document is received from the first user. A second modification of the document, which eliminates the first modification, is subsequently received from the second user. In response to a quantity of subsequent modifications, after the first and second modifications, exceeding a predetermined value, an action is initiated to prevent further modifications to the document.

DETAILED DESCRIPTION

Figure 1:
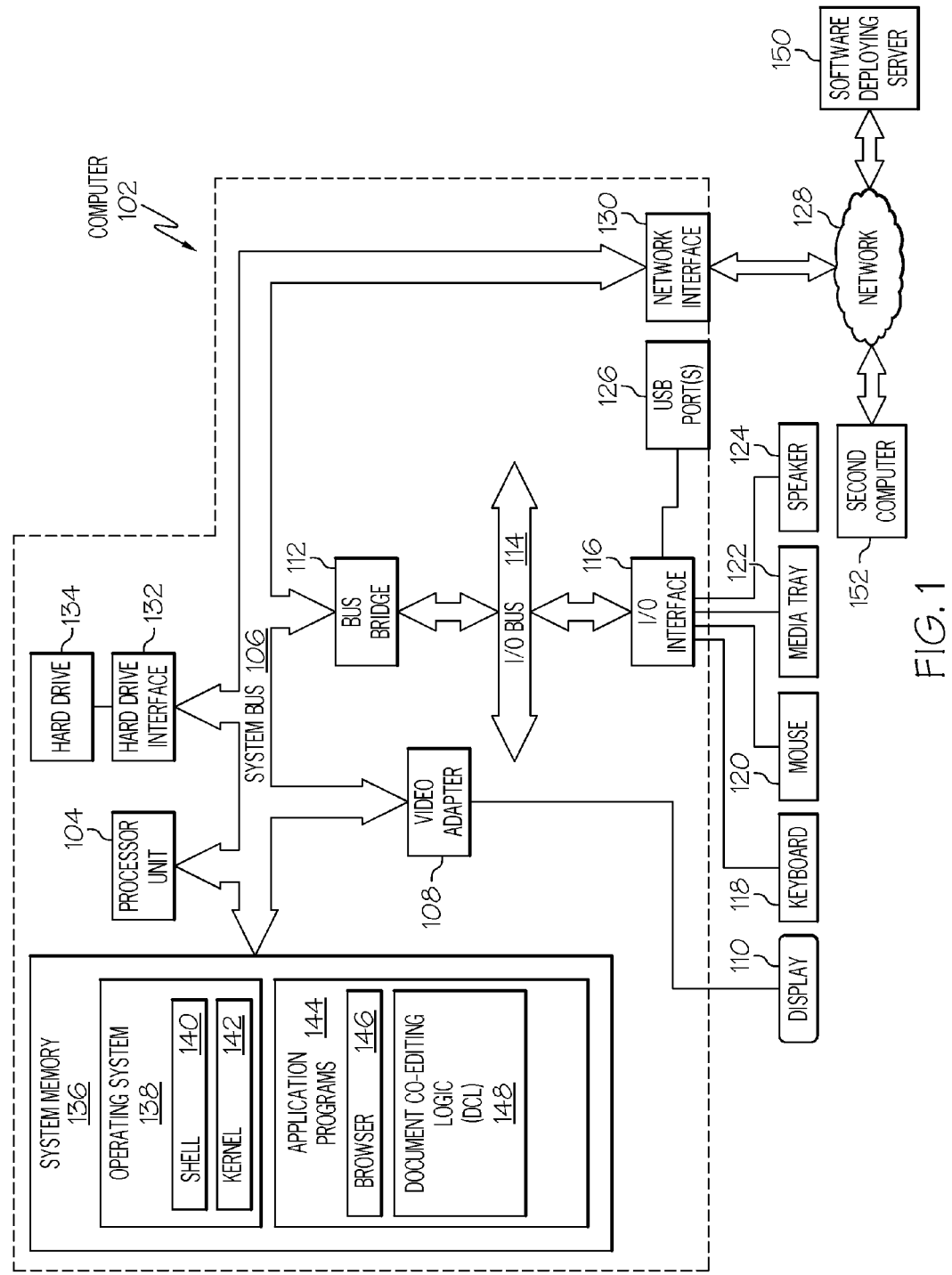
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a second computer 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as software module server 152.

Application programs 144 in computer 102's system memory (as well as software deploying server 150's system memory) also include a document co-editing logic (DCL) 148. DCL 148 includes code for implementing the processes described below, including those described in FIGS. 2-3. In one embodiment, computer 102 is able to download DCL 148 from software deploying server 150, including in an on-demand basis, wherein the code in DCL 148 is not downloaded until needed for execution. Note further that, in one embodiment of the present invention, software deploying server 150 performs all of the functions associated with the present invention (including execution of DCL 148), thus freeing computer 102 from having to use its own internal computing resources to execute DCL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
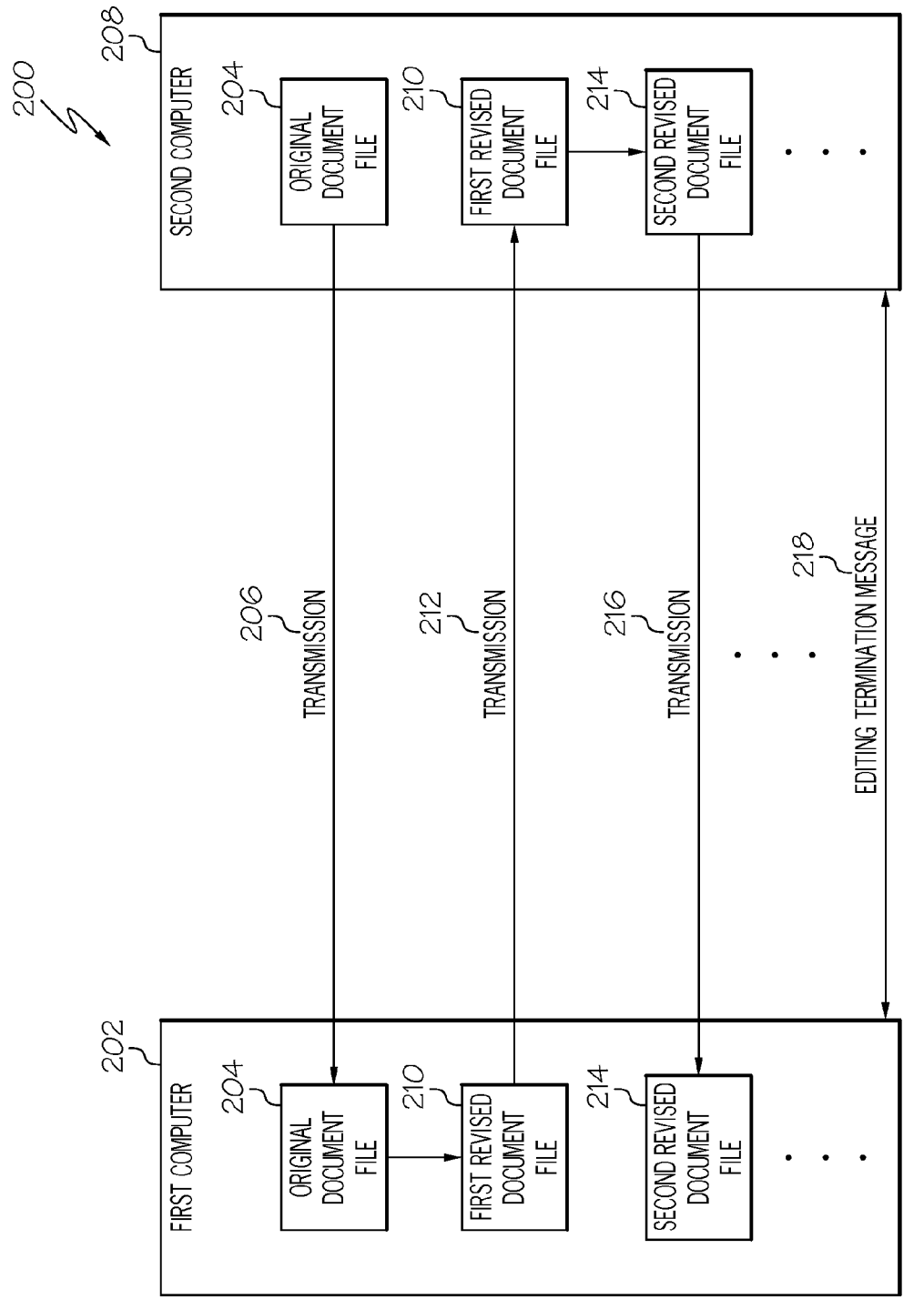
FIG. 2 illustrates an exemplary system for co-editing of a document file.

With reference now to FIG. 2, an exemplary system 200 used when coordinating document co-editing sessions as described herein is presented. A first computer 202 (e.g., computer 102 depicted in FIG. 1) holds (i.e., stores and/or otherwise has access to from another system) an original document file 204. This original document file 204 may be a text file, a video file (e.g., a digital recording from a video camera), an audio file, an animation file (e.g., animation of "cartoon" movement), a spreadsheet file, or any other type of document file that contains data. The first computer 202 obtains the original document file 204 via a transmission 206 from a second computer 208 (e.g., second computer 152 shown in FIG. 1). A user of the first computer 202 is thus able to review the original document file 204, and make revisions that result in the creation of the first revised document file 210. While in one embodiment this revision is manually created by the user of the first computer 202, in another embodiment such changes are created by the first computer 202 executing auto-editing software (e.g., part of DCL 148 depicted in FIG. 1) on the original document file 204. For example, such auto-editing software may automatically remove phrases that have been predetermined to describe security information (e.g., trade or military secrets). Other examples of such auto-editing software will auto-correct grammatical and/or spelling errors, transcribe regional/vernacular spellings (e.g., changing the British "organisation" to the American "organization"), automatically reformat data (e.g., changing 04 July 2014 to July 4, 2014 or the colloquial "Fourth of July, 2014"), etc.

As depicted further in FIG. 2, the first revised document file 210 is then sent via a transmission 212 to the second computer 208, where it is modified (either manually or using auto-editing software) into a second revised document file 214. This second revised document file 214 is then sent, via a transmission 216, back to the first computer 202 for possible further modifying/amending/editing (co-editing). This back and forth co-editing continues until an editing termination message 218 is sent to/from one or both of the first computer 202 and second computer 208. As described in further detail, this editing termination message 218 halts any further editing/co-editing of the document file (i.e., the latest revised version of the original document file 204) based on various rules/parameters, particularly during the current session. For example, future editing/co-editing to the document file may be allowed in the future, but is at least halted for the current session. A new session may be initiated based on reversing the editing/co-editing block that is initiated by the editing termination message 218.

Figure 3:
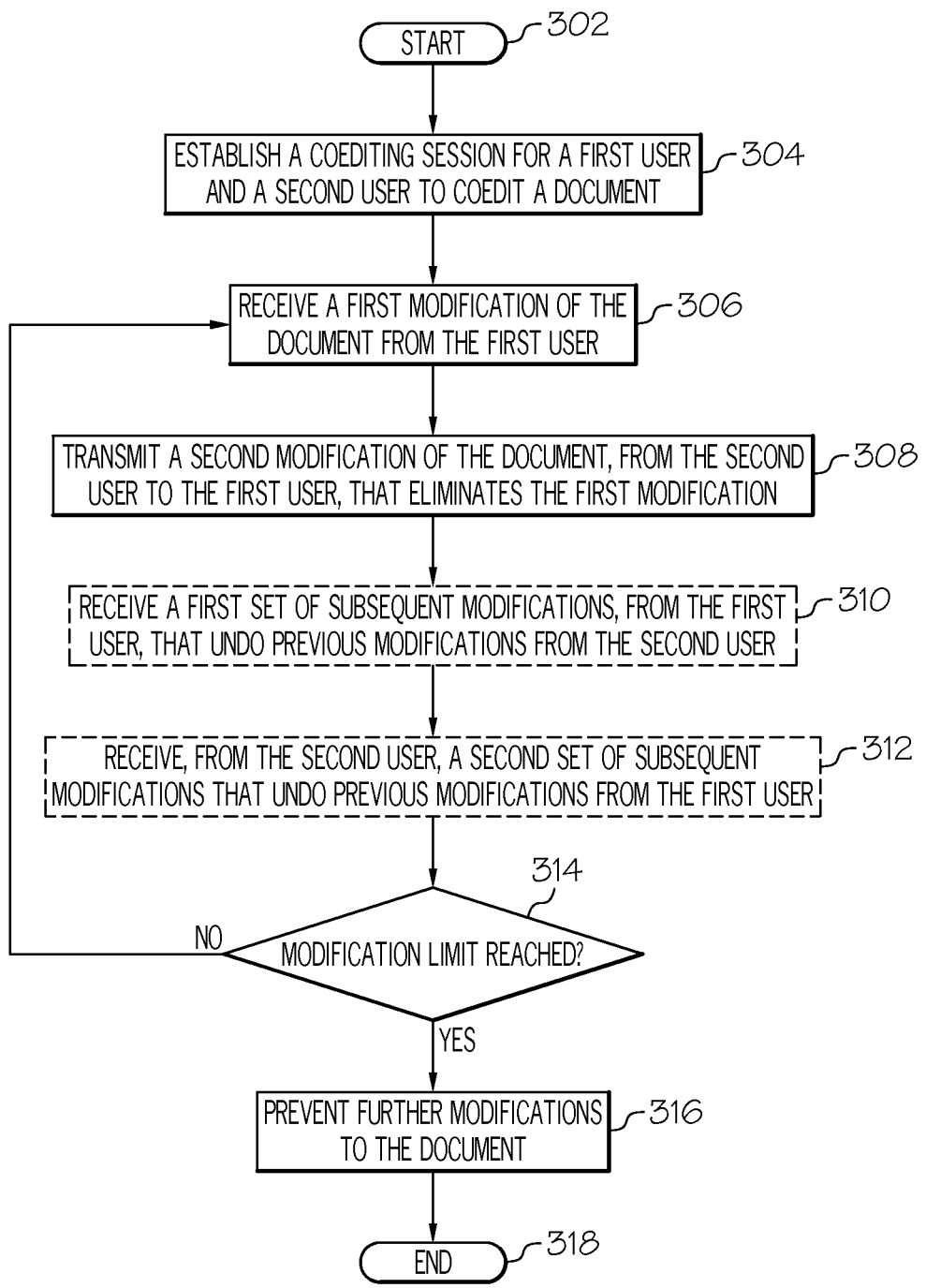
FIG. 3 is a high level flow chart of one or more exemplary steps taken by a processor or other computer hardware to facilitate co-editing of a document file.

Thus, with reference now to FIG. 3, a high level flow chart of one or more exemplary steps taken by a processor or other computer hardware to enable the mediation of a document co-editing session is presented. After initiator block 302, a co-editing session is established for a first user and a second user to co-edit a document (block 304). This co-editing session allows the two users to exchange subsequent changes/modifications back and forth. Then, as described in block 306, a second user receives a first modification of the document from the first user. The second user then makes modifications to the document that result in a second modification of the document, which is then transmitted from the second user to the first user (block 308). In one embodiment, this second modification eliminates the first modification, while in another embodiment the second modification merely adds additional changes to the document.

As described in query block 314, a query is made to determine whether the number of changes/modifications/edits made to the document, in its final version, has exceeded a predetermined value. If so, then further modifications to the document are prevented (block 316), and the process ends (terminator block 318).

As indicated by the dashed outlines for blocks 310 and 312, in one embodiment a first set of subsequent modifications, which undo previous modifications from the second user, is received from the first user (block 310). For example, the user of second computer 208 shown in FIG. 2 receives a set of modifications, which undo changes previously made at the second computer 208, from the first computer 202. Thereafter, a second set of subsequent modifications that undo previous modifications from the first user is received from the second user (block 312). That is, the user of first computer 202 shown in FIG. 2 receives a set of modifications, which undo changes previously made at the first computer 202, from the second computer 208. Thus, there are competing ("dueling") sets of modifications being traded back and forth, with each new set of modifications rejecting the modifications made by the other computer/user.

Note that in one embodiment, the document being modified/edited in the co-editing session is a text document. In this embodiment, modification changes to the text document are stored in a cache (in the first computer 202 and/or the second computer 208 shown in FIG. 2), and only the modification changes to the text document (rather than the entire text document) are displayed on a first visual display used by the first user and a second visual display used by the second user. In one embodiment, only the latest changes to the text document are transmitted in the transmissions 212 and 216 in FIG. 2.

In one embodiment, the document being modified/edited in the co-editing session is a video document. In this embodiment, modification changes to the video document are stored in a cache (in the first computer 202 and/or the second computer 208 shown in FIG. 2), and only the modification changes to the video document (rather than the entire video presentation) are displayed in a first video display used by the first user and a second video display used by the second user. In one embodiment, only the latest changes to the video document are transmitted in the transmissions 212 and 216 in FIG. 2.

In one embodiment, the document being modified/edited in the co-editing session is an audio document. In this embodiment, modification changes to the audio document in a cache are stored in a cache (in the first computer 202 and/or the second computer 208 shown in FIG. 2), and only the modification changes to the audio document are produced in a first speaker (e.g., element 124 in FIG. 1) used by the first user of the first computer 202 and a second speaker (e.g., element 124 in FIG. 1) used by the second user of the second computer 208 shown in FIG. 2.

In one embodiment, the document being modified/edited in the co-editing session is a spreadsheet document (i.e., a "spreadsheet"). In this embodiment, modification changes to affected cells in the spreadsheet document are stored in a cache (in the first computer 202 and/or the second computer 208 shown in FIG. 2), and only the modification changes to the affected cells in the spreadsheet document are displayed in a first visual display used by the first user and a second visual display used by the second user. In one embodiment, only the latest changes to the spreadsheet document are transmitted in the transmissions 212 and 216 in FIG. 2.

In one embodiment, in which the document is a spreadsheet document, there is selective locking, by one or more processors, of a first subset of cells in the spreadsheet while allowing a second subset of cells in the spreadsheet to remain unlocked. That is, locking the first subset of cells prevents the first subset from being further edited by the first and second users of the first and second computers shown in FIG. 2, while allowing the second subset of cells to remain unlocked allows the second subset to be further edited by the first and second users. In a further embodiment, if a detection is made of a prohibition against selectively locking of the first subset of cells, a message is issued to notify a user of the prohibition. For example, the first subset of cells may have been predetermined to always be available to modification. Since this first subset of cells cannot be prevented from being changed, a message indicating this condition is sent to a user of the system described herein.

As described in one embodiment herein, the determination to block any further modifications/changes to a document is determined by the number of modification/changes reaching a predetermined value. In one embodiment, this predetermined value is set according to a policy rule for a document type that describes the document, where the policy rule defines how many times a particular type of document can be modified. For example, a policy rule may state that a text document may be re-modified ten times, but a video file may only be re-modified three times (due to the amount of resources required to edit a video file compared to the resources required to make a simple text revision). In one embodiment, this policy rule may be for a particular time period. That is, in one embodiment the policy rule may allow the document (e.g., the video file) to be re-modified a certain number of times each day/week/month/etc.

As described in one embodiment herein, the determination to block any further modifications/changes to a document is determined by the number of modification/changes reaching a predetermined value. In one embodiment, this predetermined value is set according to a policy rule for a particular computer system that is used by the first user to co-edit the document, wherein the policy rule for the particular computer system limits how many times resources within the particular computer system can be committed to modifying a single document. For example, first computer 202 (and/or the second computer 208 shown in FIG. 2) may be managed by a hypervisor system, which allows certain computers to only use their resources five times when editing a document. Otherwise, these certain computers may be overloaded in the re-editing process (i.e., their resources are prevented from working on other projects/tasks). In one embodiment, this policy rule may be for a particular time period. That is, in this embodiment the policy rule may allow the document to be re-modified a certain number of times each day/week/month/etc.

As described in one embodiment herein, the determination to block any further modifications/changes to a document is determined by the number of modification/changes reaching a predetermined value. In one embodiment, this predetermined value is set according to a security policy rule for the document, where the security policy rule limits how many times versions of the document can be exchanged between computers. That is, the security policy rule may limit how many times a document can be revised. If the number of revisions exceeds a certain number (e.g., 100), then there is a presumption that the document is being maliciously altered, such as in a wiki environment. In one embodiment, this security policy rule may be for a particular time period. That is, in this embodiment this security policy rule may allow the document to be re-modified a certain number of times each day/week/month/etc. In one embodiment, the security policy rule applies to the entire document. In another embodiment, the security policy rule applies to a partial segment of the document (i.e., a phrase, paragraph, chapter, etc.). For example, assume that a certain phrase is proving troublesome to the multiple co-editors. Rather that preventing additional changes to the rest of the document, only changes to that phrase are restricted in how many times it can be changed during the editing/co-editing process.

As described in various embodiments herein, a computer-implemented method, system, and/or computer program mediates a co-editing session for a document. After establishing a co-editing session for a first user and a second user to co-edit a document, a first modification of the document is received from the first user. A second modification of the document, which eliminates the first modification, is subsequently received from the second user. In response to a quantity of subsequent modifications, after the first and second modifications, exceeding a predetermined value, an action is initiated to prevent further modifications to the document. In one embodiment, the action is a notice requesting that further modifications be prevented. In another embodiment, the action is a message that includes automatic instructions to prevent further modifications to the document.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of mediating a co-editing session for a document, the method comprising:

establishing, by one or more processors, a co-editing session for a first user and a second user to co-edit a document, wherein the document is a spreadsheet;

receiving, by one or more processors, a first modification of the document from the first user;

transmitting, by one or more processors, a second modification of the document from the second user to the first user; and in response to a quantity of subsequent modifications, after the first and second modifications, exceeding a predetermined value, initiating, by one or more processors, an action to prevent further modifications to the document;

storing, by one or more processors, modification changes to affected cells in the spreadsheet in a cache;

displaying, by one or more processors, only the modification changes to the affected cells in the spreadsheet in a first visual display used by the first user and a second visual display used by the second user;

selective locking, by one or more processors, a first subset of cells in the spreadsheet while allowing a second subset of cells in the spreadsheet to remain unlocked, wherein locking the first subset of cells prevents the first subset from being further edited by the first and second users, and wherein allowing the second subset of cells to remain unlocked allows the second subset to be further edited by the first and second users; and in response to detecting, by one or more processors, a prohibition against the selective locking of the first subset of cells, issuing a message to notify a user of the prohibition, wherein the first subset of cells retain their editability.

2. The method of claim 1, wherein the second modification eliminates the first modification.

3. The method of claim 1, wherein the document is a text document, and wherein the method further comprises:

storing, by one or more processors, modification changes to the text document in a cache; and displaying, by one or more processors, only the modification changes to the text document in a first visual display used by the first user and a second visual display used by the second user.

4. The method of claim 1, wherein the document is a video document, and wherein the method further comprises:

storing, by one or more processors, modification changes to the video document in a cache; and displaying, by one or more processors, only the modification changes to the video document in a first video display used by the first user and a second video display used by the second user.

5. The method of claim 1, wherein the document is an audio document, and wherein the method further comprises:

storing, by one or more processors, modification changes to the audio document in a cache; and producing, by one or more processors, only the modification changes to the audio document in a first speaker used by the first user and a second speaker used by the second user.

6. The method of claim 1, further comprising:

setting, by one or more processors, the predetermined value according to a policy rule for a document type that describes the document, wherein the policy rule defines how many times a particular type of document can be modified.

7. The method of claim 1, further comprising:

setting, by one or more processors, the predetermined value according to a policy rule for a particular computer system that is used by a particular user to co-edit the document, wherein the policy rule for the particular computer system limits how many times resources within the particular computer system can be committed to modifying a single document.

8. The method of claim 1, further comprising:

setting, by one or more processors, the predetermined value according to a security policy rule for the document, wherein the security policy rule limits how many times versions of the document can be exchanged between computers.

9. The method of claim 1, further comprising:

setting, by one or more processors, the predetermined value according to a security policy rule for a partial segment of the document, wherein the security policy rule limits how many times versions of the partial segment of the document can be exchanged between computers.

10. A computer program product for mediating a co-editing session for a document, the computer program product comprising a computer readable storage medium having program code embodied therewith, wherein the computer readable storage medium is not a transitory signal per se, the program code readable and executable by one or more processors to perform a method comprising:

establishing a co-editing session for a first user and a second user to co-edit a document, wherein the document is a spreadsheet;

receiving a first modification of the document from the first user;

transmitting a second modification of the document from the second user to the first user, wherein the second modification eliminates the first modification;

in response to a quantity of subsequent modifications, after the first and second modifications, exceeding a predetermined value, initiating an action to prevent further modifications to the document;

storing modification changes to affected cells in the spreadsheet in a cache;

displaying only the modification changes to the affected cells in the spreadsheet in a first visual display used by the first user and a second visual display used by the second user;

selective locking a first subset of cells in the spreadsheet while allowing a second subset of cells in the spreadsheet to remain unlocked, wherein locking the first subset of cells prevents the first subset from being further edited by the first and second users, and wherein allowing the second subset of cells to remain unlocked allows the second subset to be further edited by the first and second users; and in response to detecting a prohibition against the selective locking of the first subset of cells, issuing a message to notify a user of the prohibition, wherein the first subset of cells retain their editability.

11. A computer system comprising:

a processor, a computer readable memory, and a computer readable storage medium;

first program instructions to establish a co-editing session for a first user and a second user to co-edit a document, wherein the document is a spreadsheet;

second program instructions to receive a first modification of the document from the first user;

third program instructions to transmit a second modification of the document from the second user to the first user, wherein the second modification eliminates the first modification;

fourth program instructions to, in response to a quantity of subsequent modifications, after the first and second modifications, exceeding a predetermined value, initiate an action to prevent further modifications to the document;

fifth program instructions to store modification changes to affected cells in the spreadsheet in a cache;

sixth program instructions to display only the modification changes to the affected cells in the spreadsheet in a first visual display used by the first user and a second visual display used by the second user;

seventh program instructions to selectively lock a first subset of cells in the spreadsheet while allowing a second subset of cells in the spreadsheet to remain unlocked, wherein locking the first subset of cells prevents the first subset from being further edited by the first and second users, and wherein allowing the second subset of cells to remain unlocked allows the second subset to be further edited by the first and second users; and eighth program instructions to, in response to detecting a prohibition against the selective locking of the first subset of cells, issue a message to notify a user of the prohibition, wherein the first subset of cells retain their editability; and wherein the first, second, third, fourth, fifth, sixth, seventh, and eighth program instructions are stored on the computer readable storage medium for execution by the processor via the computer readable memory.

12. The computer system of claim 11, further comprising:

ninth program instructions to set the predetermined value according to a policy rule for a document type that describes the document, wherein the policy rule defines how many times a particular type of document can be modified; and wherein the ninth program instructions are stored on the computer readable storage medium for execution by the processor via the computer readable memory.

13. The computer system of claim 11, further comprising:

ninth program instructions to set the predetermined value according to a security policy rule for the document, wherein the security policy rule limits how many times versions of the document can be exchanged between computers; and wherein the ninth program instructions are stored on the computer readable storage medium for execution by the processor via the computer readable memory.

* * * * *